W. L. BENTON.
MOTOR TRICYCLE.
APPLICATION FILED JULY 12, 1913.
1,103,254.
Patented July 14, 1914.
2 SHEETS—SHEET 1.
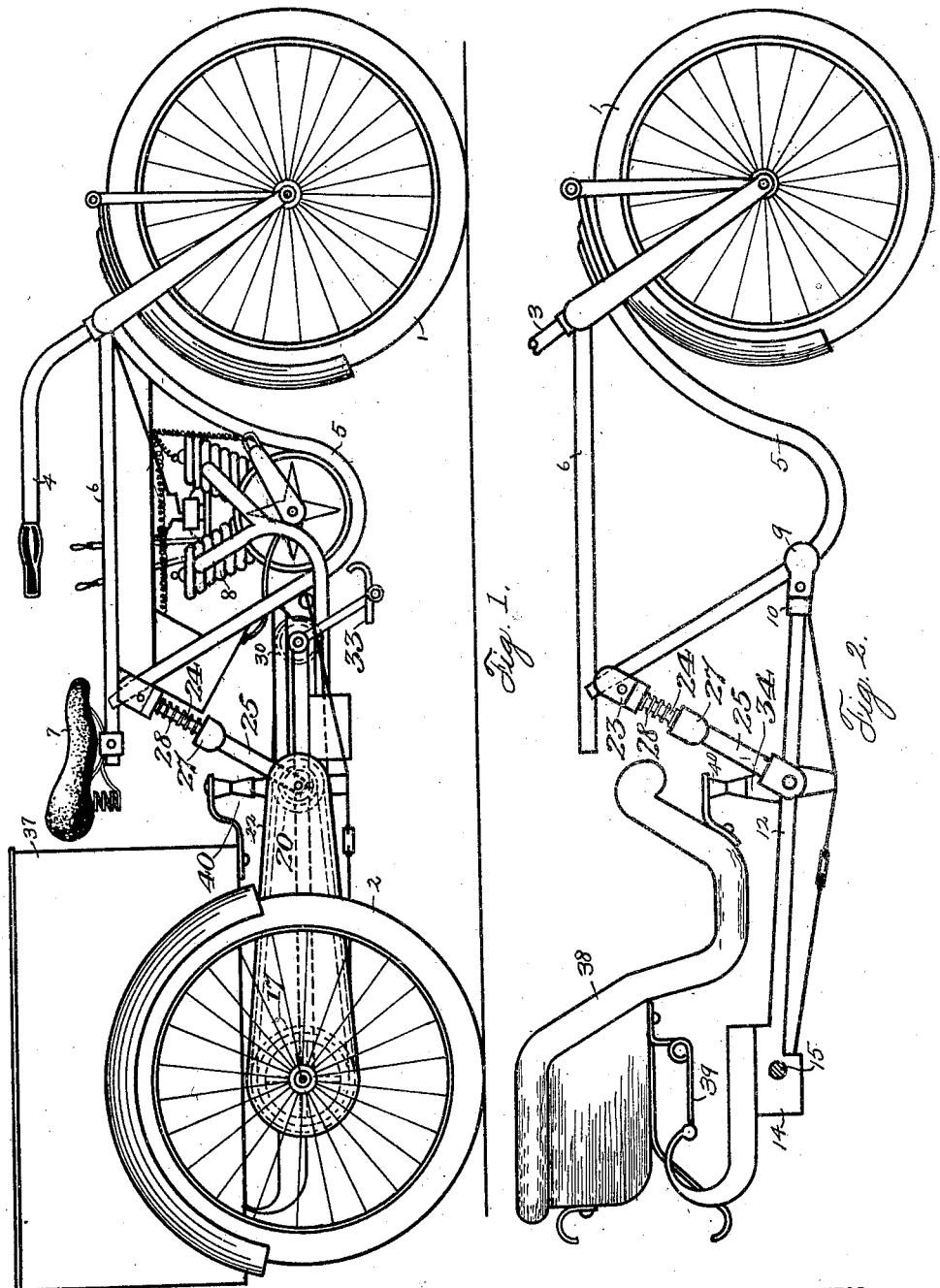
WITNESSES:
C. Baylor Hull
May Montgomery
INVENTOR
Walter L. Benton
BY
Hardway Cathey
ATTORNEYS W. L. BENTON.
MOTOR TRICYCLE.
APPLICATION FILED JULY 12, 1913.
1,103,254.
Patented July 14, 1914.
2 SHEETS—SHEET 2.
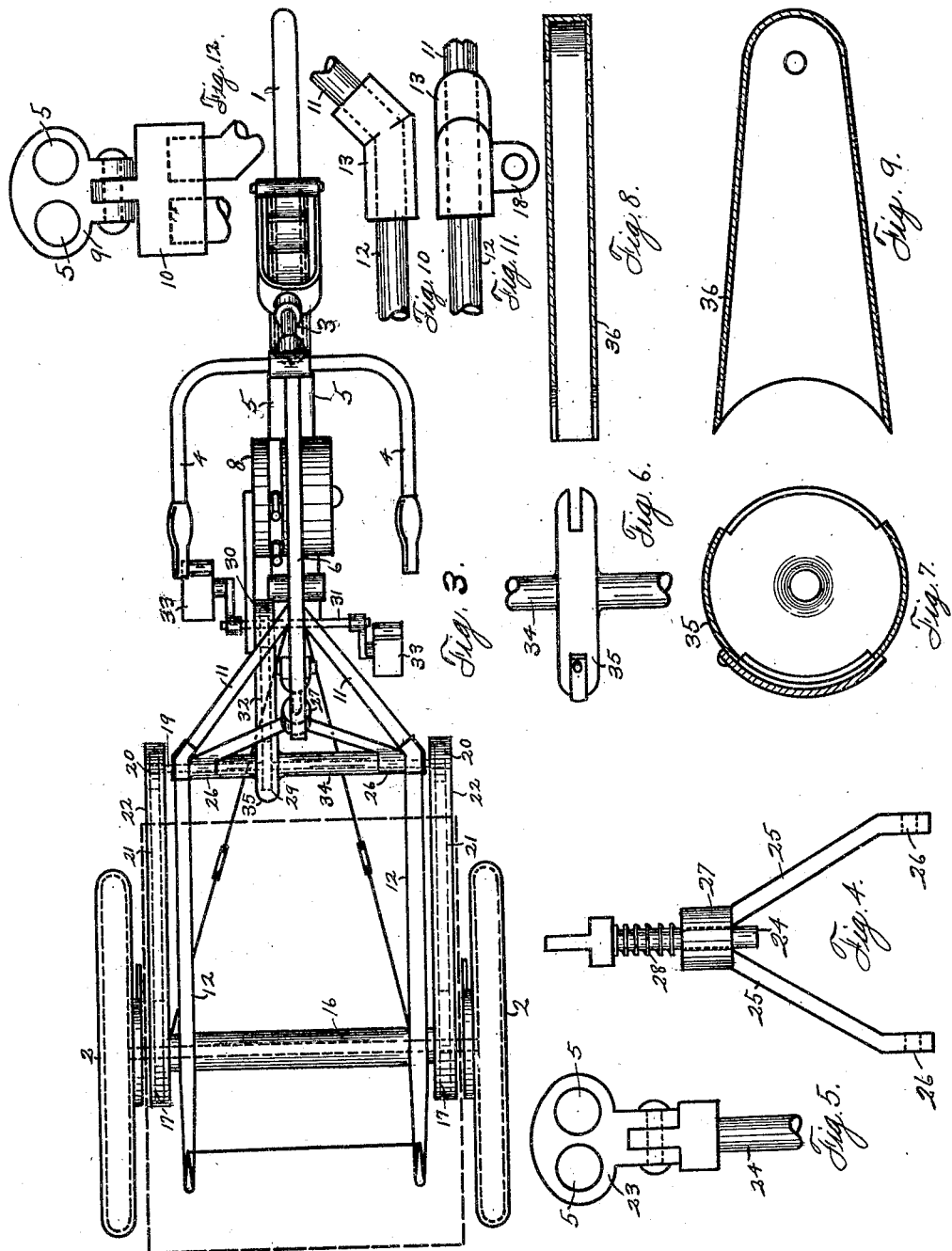
WITNESSES:
C Baylor Hill
May Montgomery
INVENTOR
Walter L. Benton
BY
Hardway & Cathy
ATTORNEYS.

UNITED STATES PATENT OFFICE.

WALTER L. BENTON, OF HOUSTON, TEXAS.

MOTOR-TRICYCLE.

1,103,254.  Specification of Letters Patent.  Patented July 14, 1914.

Application filed July 12, 1913. Serial No. 778,631.

*To all whom it may concern:*

Be it known that I, WALTER L. BENTON, a citizen of the United States, residing at Houston, in the county of Harris and State of Texas, have invented certain new and useful Improvements in Motor-Tricycles, of which the following is a specification.

This invention relates to new and useful improvements in carriers.

The object of the invention is to provide a vehicle of the character described having three wheels, a front or steering wheel and two rear or carrying wheels, and comprehends also an improved form of frame work, having a certain amount of flexibility which will permit the rear wheels to pass over obstructions and rough and uneven surfaces without transmitting the shock to the front portion of the frame and to the rider mounted on the seat carried by the front portion.

With the above and other objects in view, the invention has particular relation to certain novel features of construction, operation and arrangement of parts, an example of which is given in this specification and illustrated in the accompanying drawings, wherein—

Figure 1 is a side elevation of the complete vehicle, equipped with a bundle carrying receptacle. Fig. 2 is a side elevation thereof showing the frame work in detail, the rear wheels and driving mechanism not being shown. Fig. 3 is a plan view of the vehicle, equipped with a passenger seat. Fig. 4 shows a detail view of the resilient connection between the rear and front portions of the frame. Fig. 5 shows a detail view of the joint whereby said connection is connected to the front part of the frame. Figs. 6 and 7 show a plan view and a sectional side elevation, respectively, of the housing surrounding the sprocket wheel which is carried by the counter shaft from which the rear wheels are driven. Figs. 8 and 9 show, respectively, horizontal and vertical sectional views of the housing protecting the drive chain by means of which said counter shaft is driven. Figs. 10 and 11 show plan and side views, respectively, of a form of joint employed in the construction of the rear frame work, and Fig. 12 shows a form of joint by means of which the rear frame work is hinged to the front portion of the frame work.

Referring now more particularly to the drawings wherein like numerals of reference designate similar parts in each of the figures, the numeral 1 refers to the front or steering wheel and the numerals 2, 2 designate the rear or carrying wheels. The steering wheel is mounted in the usual manner on the steering post 3 to the upper end of which are fixed the handle bars 4, 4. The front portion of the frame work is constructed in the well known manner of the ordinary motorcycle and is pivotally secured to the steering post 3 in the well known manner. This frame work consists of two inverted arches formed of hollow tubing 5, 5 arranged side by side and the lengthwise tubing 6 connecting the ends of said arches. To the rear end of the tubing 6 a seat 7 is secured and the arches formed of the tubing 5, 5 carry the motor 8 and the other necessary appurtenances of the ordinary motorcycle. A casting 9 is provided through which the tubing 5, 5 passes. This casting is arranged near the bottom of the arches, in the rear, and to it is pivoted a block 10. Two sections of the tubing 11, 11 are provided, whose forward ends are journaled in the block 10 and which diverge rearwardly and to the rear ends of these tubings 11 are secured, respectively, tubing sections 12, 12 which are united to said sections 11 by means of the joint 13, shown in Figs. 10 and 11, said sections 12 extending back parallel to each other and forming, with the sections 11, 11 the rear frame work of the vehicle. The rear ends of the tubing sections 12, 12 have suitable bearing members, as 14, in which the rear axle 15 is rotatably mounted. The wheels 2 are fixed upon the respective ends of this axle and the axle is protected by the housing 16 and has two rigidly mounted sprocket wheels 17, 17, one near each end thereof.

Depending from each joint 13 is a bearing member 18 in which a counter shaft 19 is rotatably mounted. The ends of the countershaft have fixed thereon suitable sprocket wheels 20, 20 alined with the sprocket wheels 17, 17 and the latter mentioned sprocket wheels are driven through the former by sprocket chains 21, 21. These sprocket chains are protected by suitable guards 22, 22. The rear ends of the tubing 5, 5 forming the arches terminate in a casting 23 upon which the rear end of tubing 6 rests and to which is hinged, at its upper end, the rod 24. An arch 25 is provided whose lower ends have the bearings 26, 26 through which the shaft 19 extends and the apex of this arch has the bearing 27 through which the rod 24 extends. The upper end of the rod 24 is enlarged and interposed between said enlarged end and the bearing 27, is a strong coil spring 28 forming a flexible union between the rear and front portions of the frame work of the vehicle. The counter shaft 19 has a rigidly mounted sprocket wheel 29 alined with a corresponding sprocket wheel 30 rigidly mounted on the shaft 31 and said first mentioned sprocket wheel is driven through the sprocket chain 32 from said sprocket wheel 30. The shaft 31 is operatively connected with the engine in the usual manner and also has the usual foot pedals 33, 33. The counter shaft 19 is protected by housing 34 which is enlarged into a housing 35 which surrounds and protects the sprocket wheel 29 and the sprocket chain 32 and the sprocket wheel 30 are protected by means of the housing 36. This vehicle may be used either as a delivery car for transporting light articles or it may be used as a passenger vehicle to carry extra passengers. These two forms are illustrated, respectively, in Figs. 1 and 2.

The numeral 37 designates a receptacle for carrying such articles as it may be desired to transport and the numeral 38 designates the seat for passengers. The receptacle and seat are mounted substantially in a similar manner upon a rear spring 39 and front spring 40, the former of which is supported by the bearings 14 and the latter of which is mounted upon the housing 34.

It is obvious from the construction hereinbefore described that the two parts forming the framework of the vehicle will be flexibly united together so that shocks and jars caused by the rear wheels passing over obstructions and uneven surfaces will be, to a large extent, absorbed by the cushioning device interposed between the parts of the framework and the rider mounted on said seat 7 will not be subjected to the full force of the shocks received by the rear wheels incident to passing over rough and uneven surfaces.

While I have shown only one form of this device, it is obvious that the mechanical construction thereof may be varied without departing from the principle of the invention and I hereby reserve the right to make such mechanical changes therein as will not depart from the scope of the appended claims.

What I claim is:—

1. A device of the character described, including a front or steering wheel and two rear, or carrying wheels, a two part framework supported by said wheels, said parts being hinged together, an arch pivoted to the rear part, a bearing carried by and integral with the arch, a rod hinged to the front part, said rod being slidable in said bearing and a resilient member surrounding said rod and resisting against the bearing and forming a cushion between said parts of said framework.

2. A device of the character described including a front steering wheel and two rear carrying wheels, a two part frame work supported by said wheels, the front part of the frame work consisting of two inverted arches arranged side by side and a lengthwise member connecting the ends of said arches, a casting carried by the arches and arranged at the rear side and near the bottom thereof, a member hinged to said casting, two sections of tubing whose forward ends are secured to the hinge member and which extend rearwardly, forming the rear part of said frame work, an arch pivoted to the rear part of said frame work, a bearing carried by and integral with the arch, a rod hinged to the front part of said frame work and slidable in said bearing and a resilient member surrounding said rod and resting against the bearing and forming a cushion between the parts of said framework.

3. A device of the character described including a front steering wheel and two rear carrying wheels, a two part frame work supported by said wheels, the front part of the frame work consisting of a double inverted arch and a lengthwise member connecting the ends of said arch, a casting secured to the rear side of said arch, near the bottom thereof, a member hinged to said casting to which the rear part of the frame work is secured, an arch pivoted on each side to the rear part of said frame work, a bearing carried by and integral with said last mentioned arch, a rod hinged to the front part of said framework and slidable in said bearing and a coil spring surrounding said rod and resting against said bearing and forming a cushion between the parts of said framework.

4. A device of the character described including a front steering wheel and two rear carrying wheels, a two part framework supported by said wheels, the front part of the framework consisting of a double inverted arch and a lengthwise member connecting the ends of said arch, a casting secured to the rear side of said arch near the bottom thereof, a member hinged to said casting to which the rear part of the framework is secured, an arch pivoted on each side of the rear part of the said framework, a bearing carried by and integral with said last mentioned arch, a bearing member carried by the front part of said framework and a resilient member interposed between said bearing and forming a cushion between the parts of said framework.

In testimony whereof I have signed my name to this specification in the presence of two subscribing witnesses.

WALTER L. BENTON.

Witnesses:
　MAY MONTGOMERY,
　J. H. POWELL.